United States Patent
Matticx

(10) Patent No.: US 7,500,567 B2
(45) Date of Patent: Mar. 10, 2009

(54) CHARCOAL DISPENSING AND STORAGE CART

(76) Inventor: Robin Matticx, 3255 Oregon Trail., Olympia Fields, IL (US) 60461

( * ) Notice: Subject to any disclaimer, the term of this patent is extended or adjusted under 35 U.S.C. 154(b) by 544 days.

(21) Appl. No.: 11/176,790

(22) Filed: Jul. 7, 2005

(65) Prior Publication Data

US 2007/0006873 A1   Jan. 11, 2007

(51) Int. Cl.
*B07B 1/00* (2006.01)
*F24B 15/00* (2006.01)
*B65D 88/00* (2006.01)
*B65D 88/26* (2006.01)

(52) U.S. Cl. ............... 209/235; 209/370; 209/373; 220/2; 126/283

(58) Field of Classification Search ............... 209/235, 209/370, 373, 374, 376, 377; 220/2; 110/105, 110/108, 109; 126/283; 206/96
See application file for complete search history.

(56) References Cited

U.S. PATENT DOCUMENTS

| | | | |
|---|---|---|---|
| 295,120 A * | 3/1884 | Hanna | 209/259 |
| 302,396 A * | 7/1884 | Goss | 209/373 |
| 732,706 A * | 7/1903 | Burwell | 126/283 |
| 868,725 A * | 10/1907 | Theisen et al. | 209/337 |
| 871,929 A * | 11/1907 | Guerin | 209/298 |
| 1,323,000 A * | 11/1919 | Bizet | 209/410 |
| 1,452,691 A * | 4/1923 | Otto | 126/283 |
| 5,611,447 A | 3/1997 | Tye | |
| 6,739,331 B1 | 5/2004 | Cohen | |
| D490,958 S | 6/2004 | Koza | |
| 2006/0260599 A1* | 11/2006 | Butt | 126/25 R |
| 2007/0006536 A1* | 1/2007 | Youngs et al. | 49/502 |

* cited by examiner

*Primary Examiner*—Patrick H Mackey
*Assistant Examiner*—Mark Hageman
(74) *Attorney, Agent, or Firm*—Thomas J. Schab

(57) ABSTRACT

A storage and dispensing cart for receiving, storing, and dispensing charcoal briquettes includes a storage bin member, a storage compartment member and a screening assembly. The screening assembly is disposed within the storage bin member at a lower end to provide a continuous screening of the charcoal dust and small particles, or fines, that are developed when the charcoal briquettes move against each other during filling of the storage bin member or when the briquettes are dispensed. The screening assembly is comprised of a screen mesh that allows the fines and dust to fall to a lower collection chute that gathers and directs the fines and dust into a collection pan that forms a collection repository. The collection pan is removable from the cart so the fines and dusts can be discarded without removing all of the briquettes from the storage bin member.

9 Claims, 4 Drawing Sheets

CHARCOAL DISPENSING AND STORAGE CART

BACKGROUND OF THE INVENTION

1. Field of the Invention

The present invention relates to a charcoal briquette storage and dispensing device and more particularly to a cart for storing and dispensing charcoal briquettes where inherent charcoal briquette fines and dust are continuously screened and removed from the un-cracked charcoal briquettes stored within a storage bin member. The cart also includes a storage compartment member for storing barbequing utensils and materials.

2. Description of the Prior Art

Conventional charcoal briquettes are packaged in heavy paper bags that are rather clumsy to transport and store and are subject to tearing and outside elements, especially rain. The shortfalls associated with the use of charcoal briquettes directly from the bag precipitated the development of various types of charcoal briquette storage devices which have become known in the prior art. For example, U.S. Pat. No. 5,611,447 to Tye, discloses a molded plastic container that has a compartment for storing charcoal briquettes, as well as additional compartments for storing various utensils and materials. One shortfall of this device is that the container can only store very small portions of briquettes and has very limited storage capacity of needed cooking utensils and materials.

Another and larger type of charcoal storage and dispensing device is U.S. Pat. No. 6,739,331 to Cohen, that comprises a large receiving member for storing the charcoal briquettes and a dispensing assembly for communicating the briquettes from the storage bin. This storage cart can store very large amounts of charcoal briquettes, which is favorable to the user, however, it has no provision for storing other items that are commonly used when barbequing, such as lighter fluid, matches, cooking utensils and cooking mitts, towels, etc. Furthermore, this device has no means to screen out the charcoal dust and fines that typically accumulate at the bottom of the storage bin area.

While these devices fulfill their respective objectives and requirements, there still exists a need for a charcoal briquette storage and dispensing system that has certain improved features which allow for the storage and dispensing of charcoal briquettes, but which provide for a continuous screening of charcoal briquettes fines and dust prior to the user dispensing briquettes from the storage member and using the "cleaned" briquettes.

SUMMARY OF THE INVENTION

It is a principal object of the invention to provide an apparatus that meets the needs presented above by providing a charcoal briquette storage and dispensing cart that continuously screens unwanted charcoal briquette fines and dust from the storage container. It is another principal object of the invention to provide an apparatus that meets the needs presented above by providing a charcoal briquette storage and dispensing cart that also includes a large storage compartment member for storage of needed barbequing items such as lighter fluid, matches, pans, cooking utensils, papers towels, cooking mitts or gloves, cleansers, etc.

The object is met in the present invention with an apparatus comprising a charcoal briquette storage and dispensing cart that includes a charcoal briquette storage bin member, a storage compartment member attached to said storage bin member, and a continuous charcoal briquette fines and dust screening assembly disposed within the storage bin member for removing unwanted charcoal fines and dust from the briquettes. The screening assembly is comprised of a screening means and a collection tray which functions as a collection repository for the fines and dust.

It is also a principal object of the invention to provide a charcoal briquette storage and dispensing cart of the type wherein the storage compartment member is not provided, such that the invention in its simplest form comprises only a wheeled briquette storage and dispensing cart wherein the storage bin member includes the screening assembly, a briquette dispensing means and a cover for protecting the charcoal briquettes from the outside elements.

In one embodiment of the charcoal briquette storage and dispensing cart where a storage compartment member is provided, a single door or provision of two doors encloses the storage compartment member from the outside elements. In another embodiment, one of the wall panels on the storage compartment member is removed so as to create an open storage area.

It is another object of a preferred form of the invention to provide a screening assembly that includes a collection chute for directing the fines and dust into the collection pan so that dust clouds do not rise out of the storage bin member and contact the user.

The features and advantages of the invention will be further understood upon consideration of the following detailed description of an embodiment of the invention taken in conjunction with the drawings, in which:

DETAILED DESCRIPTION OF A PREFERRED EMBODIMENT

Figure 1:
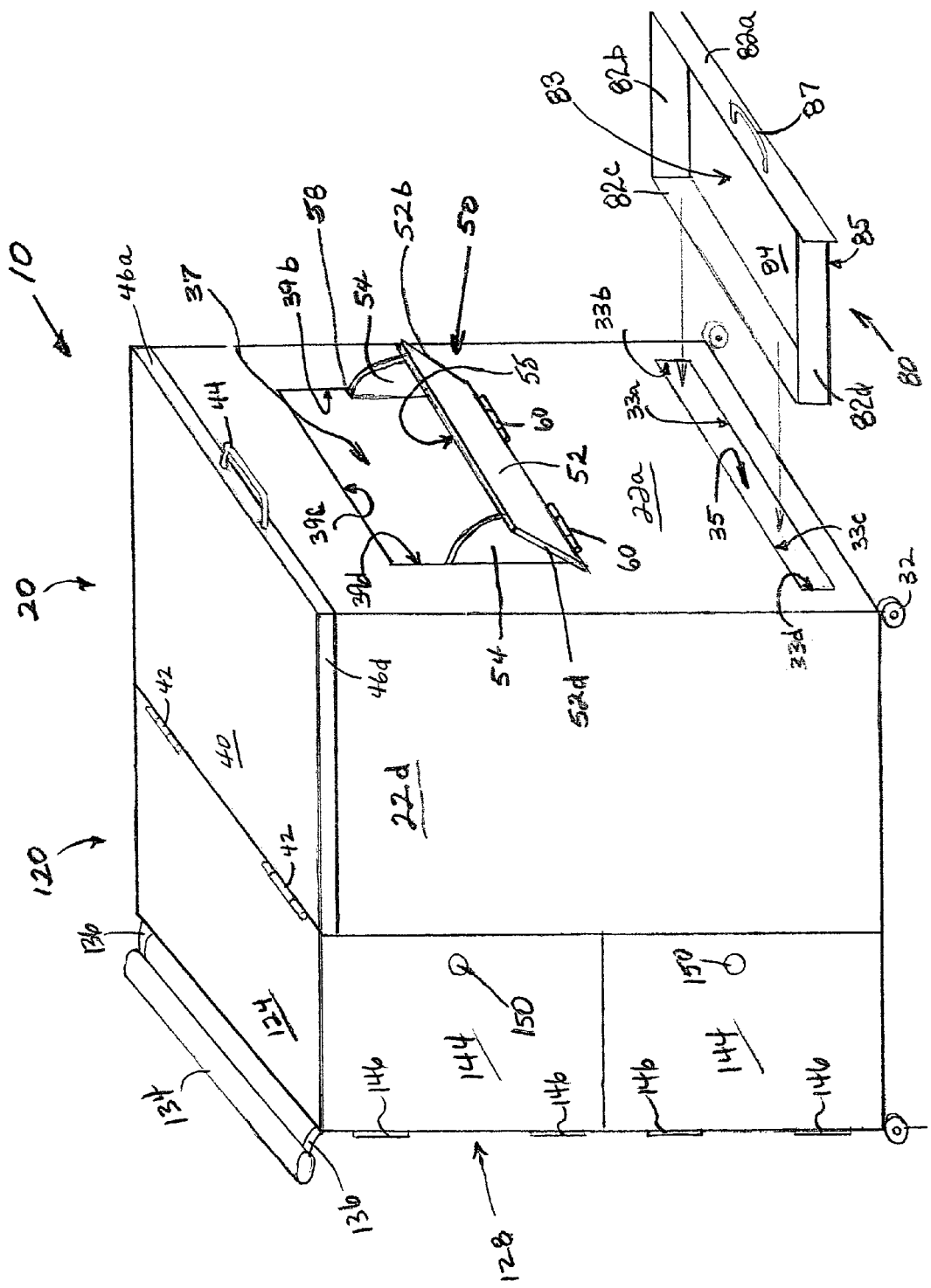
FIG. 1. is a perspective view of the charcoal storage and dispensing cart in accordance with the present invention with the collection pan exploded away.

For purposes of promoting and understanding the principles of the charcoal briquette storage and dispensing cart 10 of the present invention, reference will now be made to an embodiment illustrated in the drawings, and specific language will be used to describe the same. It will nevertheless be understood that no limitation of the scope of the invention is thereby intended, there being contemplated such alterations and modifications of the illustrative device, in such further applications of the principals of the invention as discussed herein, as would normally occur to one skilled in the art to which the invention pertains.

Figure 2:
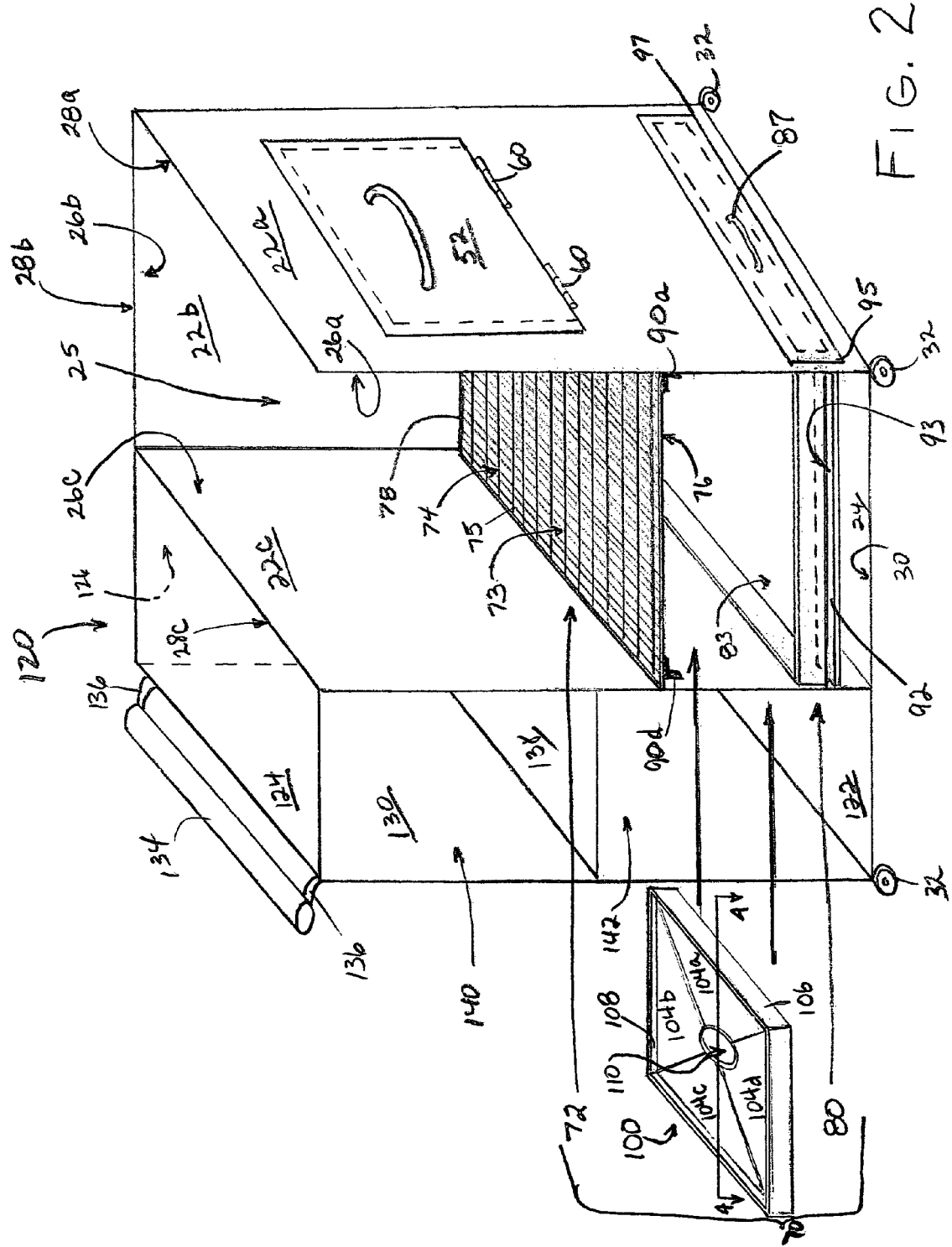
FIG. 2 is a perspective view of the invention shown in FIG. 1 with one of the lateral side walls removed on both the storage bin member and the storage compartment member to emphasize the screening assembly which forms an integral part of the invention, as well as other internal features.

With reference to FIGS. 1 and 2, the preferred embodiment of an improved charcoal briquette storage and dispensing cart 10 is illustrated and is seen to include a storage bin member 20 for receiving, storing and dispensing charcoal briquettes and a storage compartment member 120 that is integrally coupled to the storage bin member 20. A briquette dispensing means 50 is coupled to the storage bin member 20. The dispensing means 50 facilitates a user to gain access to the interior of said storage bin member 20 and retrieve charcoal briquettes that are stored within. When briquettes are not being withdrawn, the dispensing means 50 is to be closed, as shown in FIG. 2. Also shown in FIG. 2, it is seen that the cart 10 includes a removable screening assembly 70 that is mounted within storage member 20. The screening assembly 70 is designed to remove the briquette fines and dust that is typically found within the bags of charcoal briquettes that are purchased or which form after the briquettes break apart during their initial pouring or storage within storage bin member 20. A detailed explanation of the screening assembly 70 will follow later herein. In another embodiment of the invention, the cart 10 may comprise a stand-alone storage bin member 20 that includes the dispensing means 50 and the screening assembly 70, and other components that will be described herein, but does not include the storage compartment member 120.

The storage bin member 20 is formed by a continuous perimeter wall 22 having interconnected sides 22a-22d that are attached to a bottom floor 24. The perimeter wall 22 and floor 24 define an interior space 25 that is delimited by interior wall surfaces 26a-26d and floor surface 30, which are best seen in FIG. 2, where the cover 40 and perimeter wall 22d have been removed for clarity's sake so that the interior can be better seen and understood. The interior wall surfaces 26a-26d terminate at top edge surfaces 28a-28d. Of course, because side wall 22d has been removed, the interior wall surface 26d and top edge surface 28d are not seen in FIG. 2, but would have similar attributes as the other interior wall surfaces and top edge surfaces, as one in the art could readily understand. At a lower end of storage bin member 20, at least two opposed, like wheels 32 are attached underneath the cart 10 at the corners where floor 24 interconnects with sides 22a, 22b and 22c. An optional set of like wheels 32 (not shown) may be attached at the corners where floor 24 interconnects with sides 22b, 22c, and 22d.

The upper end of storage member 20 includes a cover 40 that rests on top edges 26a-26d to close and seal the interior space 25 from exposure to the outside elements. The cover 40 may be freely floating upon the top edges 28a-28d, or preferably, it is secured to the storage bin member 20 by attaching it to one of the perimeter walls by hinges. In the drawing figure, the cover 40 is shown attached to perimeter wall 22c along the interior wall surface 28c by a pair of identical, laterally-spaced hinges 42 although it is immaterial to the functionality of the invention which perimeter wall the hinges are actually attached. The cover 40 further includes a handle 44 for assistance in lifting the cover upwardly for disengagement with the top edges 26a-26d, so that the interior space 25 can be exposed for the additional of more charcoal briquettes. The cover 40 is also provided with extension panels 46a, 46b, and 46d, although the extension panel 46b cannot be seen in the drawing figure. There is no extension panel 46c on the cover side where the hinges 42 are located in order to provide clearance for the cover to swing upwards. The extension panels 46 function to seal the interior space 25 from wet weather and to diminish the effects of extreme winds which would likely blow under the cover and lift it if the extension panels were not present. The handle 44 should be centrally mounted in an opposed relationship from the hinges 44 in order to obtain the greatest mechanical advantage when lifting the cover 40. If the cover is not attached to the perimeter wall 22 by hinges, then a pair of spaced handles should be provided on the opposed extension panels 46b and 46d in order to facilitate lifting or sliding cover 40 entirely off the storage bin member 20. In that embodiment, the location of such handles on the extension panels would be readily understood by those in the art.

Figure 3:
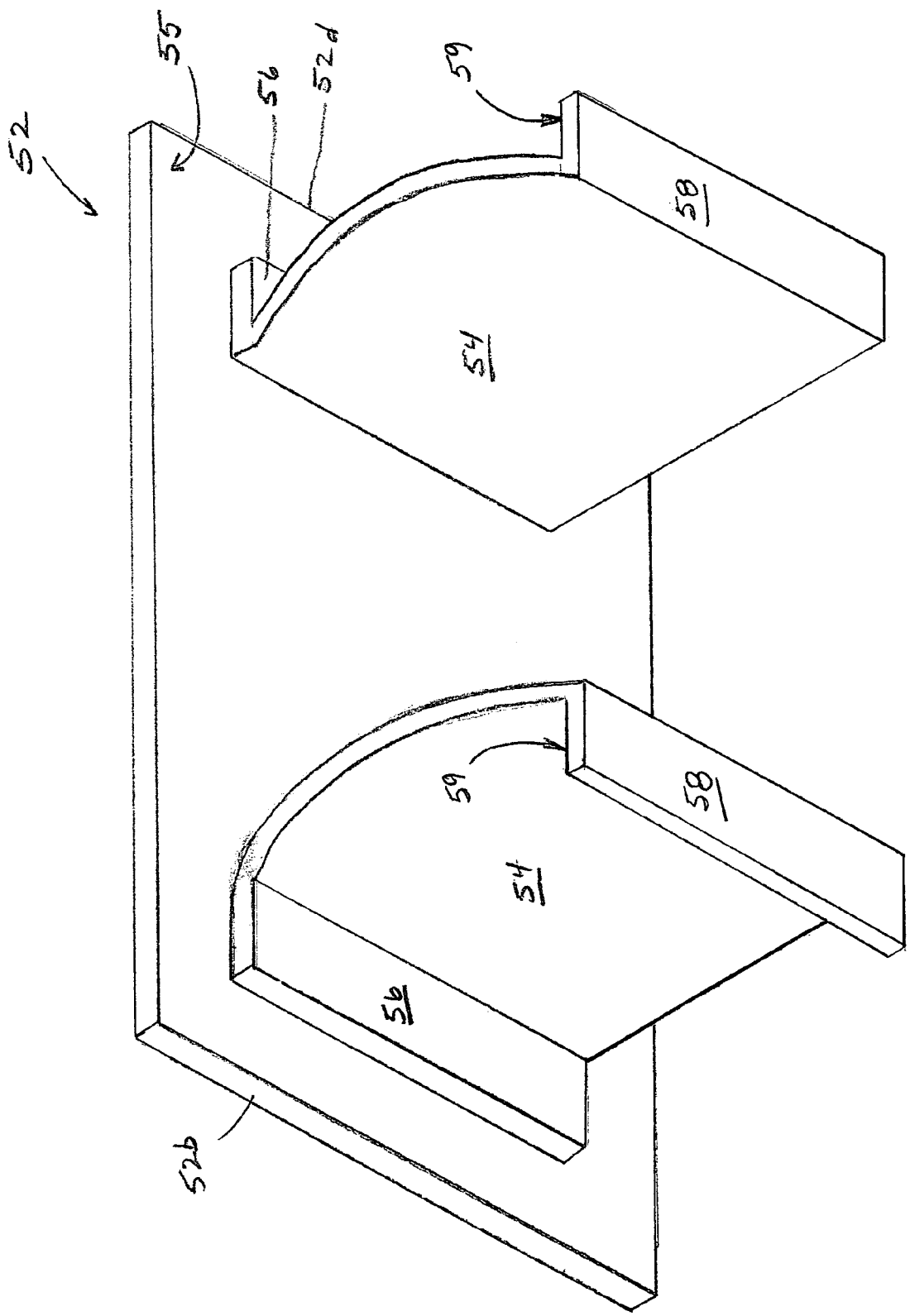
FIG. 3 is a perspective view of the dispensing means that is shown in FIG. 1.

Turning to FIG. 1, it is seen that perimeter wall 22a is provided with a slot 35 near the lower end of bin member 20 and a relatively large aperture 37 near the upper end. Both the slot 35 and the aperture 37 are in communication with the interior space 25. The slot 35 is defined by peripheral edge surfaces 33a-33d, while aperture 37 is defined by edge surfaces 39a-39d. The edge surface 39a is not clearly seen in any of the drawing figures but it is to be understood that surface 39a is one on which identical hinges 60 are attached. A charcoal briquette dispensing means 50 is selectively coupled to the storage bin 20, while in communication with aperture 37 and interior space 25. The dispensing means 50 comprises a cover plate 52 that includes opposed, identical side panels 54 projecting there from. Turning attention to FIG. 3, it is seen that each side panel 54 has a similar proximate end that include an identical first collar 56 which is attached to the inside surface 55 of cover plate 52. Each first collar 56 is located laterally inward the same distance from the respective side edges 52b and 52d. Each side panel 54 also has similar terminal end that includes a second collar 58. When the cover plate 52 is pulled away from perimeter wall 22a to gain access to the charcoal briquettes, the surfaces 59 come into contact against interior wall surface 26a, thereby preventing the cover plate 52 from further motion. When the dispensing means is in the open position, as shown in FIG. 1, a user can reach inside interior space 25 to withdraw the charcoal briquettes with whatever means the user employs. When the dispensing means 50 is pushed to a closed position, as shown in FIG. 2, the collars 58 will disengage interior wall surface 26a and move within interior space 25, whereby the inside surface 55 of cover plate 52 will contact and rest against perimeter wall 22a. The distance between collars 56 and 58 defines the extent of each side panel 54 and hence, the amount of opening the cover plate 52 will extend outwardly away from perimeter wall 22a. As illustrated in FIG. 2, it is also preferred that cover plate 52 be of dimensions so as to extend beyond the size or perimeter of aperture 37, which is defined by edge surfaces 39b, 39c and 39d, seen in dashed-line form in the FIG. 2. Providing the cover plate 52 as such, ensures good sealing of aperture 37 and functions as a means for stopping the movement of the cover plate against the perimeter wall 22a. The pair of laterally spaced, hinges 60 as shown, are to be attached along edge surface 39a so as to connect the cover plate 52 to the storage bin 20. Moreover, it is preferable that said hinges be spring-loaded so that the cover plate 52 becomes harder to pull into an open position the further it is moved away from perimeter wall 22a. The spring resistance facilitates the sealing of cover plate 52 against perimeter wall 22a. If spring-loaded hinges are not utilized, then cover member 52 should be latched to perimeter wall 22a by any means well known in the art in order to prevent dispensing means 50 from opening at will.

FIG. 1 illustrates that the slot 35 near the bottom of storage bin member 20 receives a removable collection tray 80, which is one part of a screening assembly 70. The remaining components of the screening assembly are best seen when viewing FIG. 2. In that figure, the screening assembly 70 is seen to further comprise the screening means 72 and may also include the collection chute 90. In keeping with one of the principal objects of the invention, the screening assembly 70 is designed to remove the charcoal dust and fines from the briquettes, both of which are unwanted materials that accumulate at the bottom of a typical charcoal briquette storage cart. The screening means 72 is comprised of a plurality of interlaced rows of heavy gauge wires 75. The plurality of rows 75 further define a plurality of identical, squarely-configured openings 73. Each opening 73 is preferably sized to be about one half inch across, being no larger than about three quarters of an inch across, and no smaller than about three eights of an inch across. The rows of wires as described form a sieve like structure having a top and a bottom surface 74, 76, respectively, that is delimited by a peripheral binding 78. The screening means 72 is positioned and restrained from movement within interior space 25 by the identical support brackets 90a-90d. The support brackets 90 are coupled to the interior wall surfaces 26a-26d, near the respective corners that are formed between interconnecting interior wall surfaces. Although the perimeter wall 22d was removed for clarity's sake, only two of the four support brackets can be seen supporting screening means 72, that being support bracket 90a and 90d. Another pair of brackets (90b and 90c) would be located on the interior wall surfaces 26a and 26c, laterally spaced from brackets 90a and 90d, but in opposite corners. Alternatively, brackets 90a-90d could have been attached to interior wall surfaces 26b and 26d, at each corner thereof. The brackets 90 shown in the FIG. 2 illustration, have a generally L-shaped configuration, but alternative styles and types of brackets may be used. The screening means 72 is removable from interior space 25 by first retracting the cover 40, and then gripping the screening means through the openings 73, and then lifting it upwardly from support brackets 90a-90d, before tilting it and pulling it out of the storage bin member 20. The screening means 72 does not have to be limited to only a wire based member, as those in the art should realize that a sieve-like structure can be formed from a plate that is provided with a matrix of round or square holes that are of the desired sizes which were mentioned above.

The collection tray 80 of the screening assembly 70 is slidably removable from the interior space 25 and storage bin 20. The collection tray 80 includes a peripheral wall 82 that is comprised of interconnected walls 82a-82d and a bottom wall 84. The bottom wall 84 includes an upper surface 83 and a lower surface 85, wherein the bottom wall 84 and the interconnected peripheral walls 82a-82d define a collection repository there between for catching and retaining the charcoal fines and dust that fall through the screening means 72. In a preferred embodiment, the lower surface 85 of bottom wall 84 is guided in and out of slotted opening 35 by sliding along a pair of horizontally disposed guide means 92 that are laterally spaced from each other as the collection tray is either pulled or pushed through use of handle 87. Only one of the guide means is seen in FIG. 2, however, the other guide means would be similarly located on the opposite side of the collection tray 80, so as to similarly support the collection tray on that side. Each of the guide means 92 are identical to each other and they may comprise any arrangement which facilitates sliding movement of collection tray 80 into and out of slot 35 and interior space 25. For that matter, the guide means may be of a solid or hollow construction that has a geometrically-shaped cross-section such as a circle, square, or rectangular, or they have an L-shaped, T-shaped or C-shaped cross-section. Further, the guide means 92 may even consists of a roller wheel sliding within a track. Whichever type is employed, each guide means 90 will be horizontally disposed within the interior space 25 such that they extend from interior wall surface 26a to 26c so that lower surface 85 of collection tray 80 will always slide along the top surface 93, thereby guiding the collection tray into and out of interior space 25. In FIG. 2, a part of the guide means 92 is shown in dashed line form, underneath the collection tray. Each guide means 90 is attached within storage bin member 20 at a same vertical distance from floor 24 so that the top surface 93 of each guide means 92 is co-planar with peripheral edge surface 33a, and such that each guide means is respectively juxtapositioned near a respective lower corner 95 and 97. In this way, a smooth, interrupted insertion and removal from slot 35 may be facilitated. When the collection tray 80 is fully inserted within storage bin 20, the collection repository is in communication with interior space 25 with the screening means 72 that is superimposed above it. When the collection repository fills, the collection tray 80 is removed and the contents are disposed in a trash container. As FIG. 2 illustrates, peripheral wall 82a is preferably sized to extend beyond the edges surfaces 39a-39d, which are seen in dashed-line form, to ensure proper sealing of slot 35 and to prevent collection tray 80 from being over-inserted into interior space 25.

Figure 4:
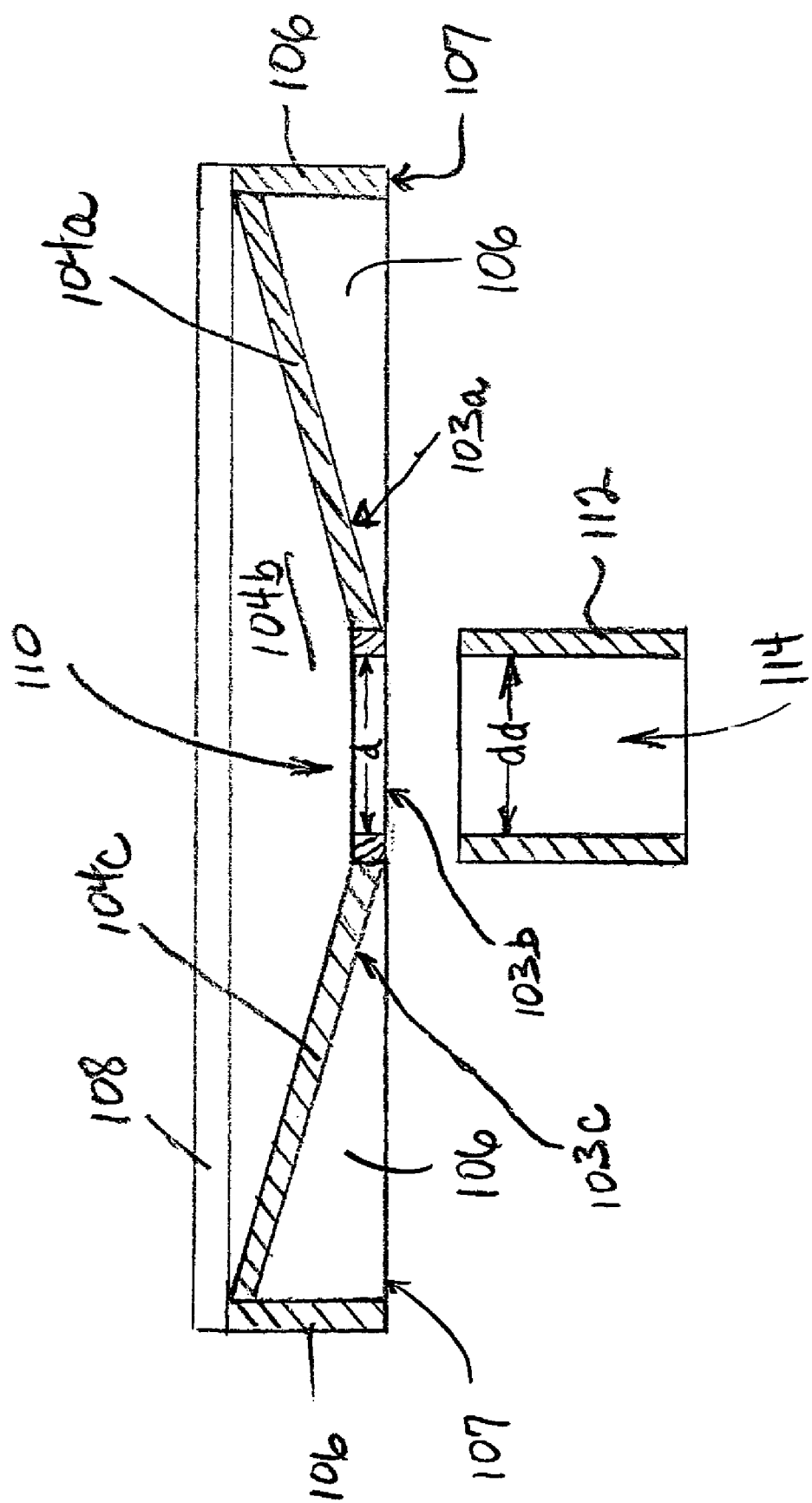
FIG. 4 is a cross-sectional view the collection chute member of the screening assembly of the present invention taken along line 4-4 of FIG. 2.

FIG. 2 also shows that the screening assembly 70 may further include a collection chute 100, which is shown removed from the interior space 25 of the collection bin 20. When in use, the collection chute 100 is to be disposed between the screening means 72 and the collection tray 80, as indicated by the heavy arrows. The collection chute 100 is comprised of identical interconnected plates 104a-104d that are encased by a perimeter wall 106. Each plate is identical in all respects and generally is configured like a triangle. The base of each plate 104a-104d is considered its proximate end and each proximate end is joined to the perimeter wall 106 such that a portion of the wall vertically extends above each plate to form a peripheral lip 108 around the collection chute 100. The plates 104a-104d also have identical downward slopes such that each plate's respective distal end terminates at a common central opening 110. Optionally, the collection chute 100 may further include a discharge sleeve 112 coupled about the central opening 110, attached to the underside of collection chute 100. The peripheral lip 108 and the discharge sleeve 112 have details which are better understood when viewing FIG. 4, which shows a cross-sectional view of collection chute 100 taken along line 4-4 of FIG. 2. In FIG. 4, the discharge sleeve 112 is exploded slightly away from the collection chute proper. The discharge sleeve 112 has a central through bore 114 extending the length of the sleeve which defines an inside diameter or extent "dd." The central opening 110 likewise has an inside diameter or extent "d," whereby the extent "dd" and "d" are exactly the same diameters. Thus, it should be clear that when the discharge sleeve 112 is coupled to the bottom of the collection chute 100, the central opening 110 and opening 114 are in vertical positional alignment with each other so that any charcoal dust and/or fines that fall into the collection chute 100 will flow downwardly along the sloped plates 104a-104d, first into the central opening 110 and then into opening 114, before dropping into collection pan 80. Use of the discharge sleeve is preferable in order to reduce the amount of dust that clouds upwardly towards cover 40 when charcoal briquettes are added to the collection bin 20. Also, FIG. 4 emphasizes that the slope of each plate 104 is chosen so that the respective bottom surfaces 103a-103d do not extend to a horizontal plane that is elevationally lower than a horizontal plane that would extend along the bottom edge surface 107 of the perimeter wall 106.

Turning again to both FIGS. 1 and 2, it is seen that the dispensing cart 10 of the invention may also include a storage compartment member 120. Preferably, the storage compartment 120 is attached to the opposing perimeter wall of the storage bin member 20 that contains the dispensing means 50; in this case, the storage compartment member 120 is attached to perimeter wall 22c. Storage compartment member 120 is comprised of a bottom wall 122, a top wall 124, a first lateral wall 126, a second lateral wall 128, (herein comprised of two identical doors) and a front wall 130. A back wall (not shown) could optionally be provided so as to interconnect with the top, bottom and lateral walls 122,124,126,128 prior to attachment to perimeter wall 22c of the storage bin member 20. However, it is preferable that the storage compartment member does not provide a separate back wall, but rather share wall 22c in order to reduce the costs of materials required for construction. The storage compartment member 120 further includes a transport handle 134 that is connected to storage compartment member 120 by identical posts 136. The transport handle is used to push the cart 10 to a desired location and it also functions as a towel bar and utensil hanger. The front wall 130 may also include at least one hook for hanging utensils and said hooks are so well known in the art that it is not shown in the drawing figures. Top wall 124 is ideally suited for use as a cutting surface or food/drink preparation area. In a preferred embodiment, the storage compartment member 120 forms part of the cart 10 and includes at least one interior shelf 138 as shown, to form a first and a second storage area 140,142. It is also preferred that one of the lateral walls, in this case the second lateral wall 128, be comprised of two identical doors 144 that are attached to the front wall 130 by the vertically spaced, identical hinges 146 and that each door 144 be provided with identical handles 150. In that way, each storage area 140,142 could be designated for whatever function the user desires. In another embodiment, instead of providing two identical doors 144, the entire second lateral wall 128 could be provided as a single, unitary member that is hinged so that the entire wall panel functions as a single door to enclose storage areas 140,142. That embodiment is easily understood by those in the art and thus it has not be shown in the drawing figures. In still another embodiment, the lateral walls 126,128 would be provided as single, unitary panels and the front wall 130 would be completely eliminated so that the front or handle-side of cart 10 presents, longitudinally open shelving compartments 140,142 that would not be closed off by a door or doors. It is further seen that the storage compartment member 120 also includes wheels 32 at the corner intersections between front wall 130 and lateral walls 126 and 128, although one of the wheels of the storage compartment member 120 cannot be seen in the drawing figures. The wheels of the storage compartment member 120 are identical to those on the storage bin member 20. The present invention does not depend upon the provision of the storage compartment member 120, and if that member is not included as part of the cart 10, then posts 136 of transport handle 134 would be attached to perimeter wall 22c.

With respect to the above description, it is to be realized that the optimum dimensional relationships for the components of the invention, to include variations in size, materials used, their individual shape, form, function and manner of operation, assembly and use are deemed readily apparent and obvious to one skilled in the art and equivalent relationships to those presented in the drawings and described in the written specification are intended to be encompassed by the present invention.

Therefore, while the apparatus herein disclosed form a preferred embodiment of this invention, it will be understood that this invention is not so limited, and changes can be made without departing from the scope and spirit of this invention, which is defined in the appended claims.

I claim:

1. A cart for receiving, storing, and dispensing charcoal briquettes, comprising:

a storage bin member comprised of interconnected perimeter walls that are connected to a floor, thereby defining an interior space that has an open, upper end and a closed, lower end, said open end adapted for receiving and storing charcoal briquettes within said interior space, said storage bin member including a cover for enclosing and sealing said interior space against various weather conditions, a removable screening assembly disposed within said interior space for continuously removing charcoal briquette fines and dust from said storage bin member, and a dispensing means adapted for facilitating removal of charcoal briquettes from the interior space of said storage bin member when said upper end is enclosed by said cover, wherein one of said perimeter walls is provided with an aperture that is in communication with said interior space and said dispensing means is selectively coupled to said storage bin member through said aperture, wherein the dispensing means is comprised of a cover plate having an inside and outside surface and a pair of opposed, identical side panels projecting from said inside surface of said cover plate, each of said side panels having a common proximate end and terminal end, wherein each side panel further includes an identical first and second collar attached thereto, said first collar located at said proximate end of said side panel and said second collar located at said terminal end of said side panel, wherein said screening assembly comprises a screening means, a collection chute superimposed below said screening means and a collection tray superimposed below said collection chute, wherein one of said perimeter walls is provided with a slot that is in communication with said interior space and wherein said collection tray of said screening assembly is removable from said storage bin member through said slot and;

a storage compartment member coupled to said storage bin member.

2. The cart of claim 1, wherein when said dispensing means is in a closed position, said aperture is completely covered and said inside surface of said cover contacts the perimeter wall of said storage bin and wherein when said dispensing means is in an open position, said cover plate is pulled away from said aperture such that said second collar contacts and interior wall surface of said perimeter wall.

3. The cart of claim 1, wherein the screening means has a sieve-like configuration.

4. The cart of claim 3, wherein the sieve-like configuration is defined by a plurality of interlaced rows of wires that form a plurality of squarely configured openings, said plurality of wires delimited b a peripheral binding.

5. The cart of claim 1, wherein said collection tray is comprised of a peripheral wall connected to a bottom wall, thereby defining a collection repository for catching and retaining charcoal fines and dust that falls through the screening means.

6. The cart of claim 1, wherein said collection chute is comprised of identical interconnected plates having common terminal and distal ends, wherein the proximate ends are joined to a perimeter wall and the distal ends terminate at a common central opening.

7. The cart of claim 1, wherein the storage compartment is comprised of a top wall connected to opposed first and second lateral walls and a bottom wall connected to said lateral walls and a shelf interconnecting said laterals walls together to form a first and a second storage area, said lateral walls being unitary members.

8. The cart of claim 7, further comprising a front wall interconnecting said top and bottom walls together.

9. The cart of claim 8, wherein at least one of said lateral walls is comprised of at least one door to provide access to said storage areas.

* * * * *